United States Patent [19]

Bohman

[11] 4,379,559
[45] Apr. 12, 1983

[54] PIPE SEALING DEVICE

[75] Inventor: Nils-Erik Bohman, Forsheda, Sweden

[73] Assignee: Forsheda Gummifabrik AB, Forsheda, Sweden

[21] Appl. No.: 265,619

[22] Filed: May 20, 1981

Related U.S. Application Data

[63] Continuation of Ser. No. 53,701, Jun. 29, 1979, abandoned.

[51] Int. Cl.³ .............................................. F16L 19/00
[52] U.S. Cl. ................................. 277/207 A; 138/109; 285/345; 285/379
[58] Field of Search .............................. 138/109, 155; 277/207 A; 285/345, 379

[56] References Cited

U.S. PATENT DOCUMENTS

| | | | |
|---|---|---|---|
| 1,924,020 | 8/1933 | Bihet | 277/207 A |
| 3,081,102 | 3/1963 | Murray et al. | 277/207 A X |
| 3,372,942 | 3/1968 | Carter | 277/207 A |

*Primary Examiner*—James E. Bryant, III

*Attorney, Agent, or Firm*—Gust, Irish, Jeffers & Hoffman

[57] ABSTRACT

A sealing device for providing a fluid-tight seal when jointing different types of pipes. The sealing device comprises a sealing ring made of a resilient material are positioned in an annular groove in the outer pipe, and has a sealing portion adapted sealingly to engage an inner pipe introduced therein. A retainer ring made of a rigid or semi-rigid material cooperates with a radially inwardly extending projection of the sealing ring for retaining the sealing ring in a correct position in the groove during the introduction of the end portion of the inner pipe to a position wherein the end portion of the pipe deforms the sealing portion. The projection is positioned immediately in front of the retainer ring in the direction of introduction of the inner pipe, and the sealing portion is positioned behind the retainer ring. Preferably, the projection converges in the direction of introduction of the inner pipe so that the projection is folded over the retainer ring and presses the ring radially outwards when the projection is deformed by the inner pipe.

3 Claims, 4 Drawing Figures

PIPE SEALING DEVICE

This is a continuation, of application Ser. No. 53,701, filed June 29, 1979, now abandoned.

BACKGROUND OF THE INVENTION

The present invention relates to a sealing device comprising a sealing ring consisting of an elastic material and also comprising means for retaining the sealing ring in a groove in a pipe, especially during the mounting of the pipe joint.

In jointing different types of pipes and especially pipes consisting of plastic material and adapted to constitute water pipes which shall be able to stand substantial inner overpressures but also lower outer pressures, it is preferred to position the sealing rings for sealing the pipe joints in the grooves for retaining the sealing rings already at the manufacturing of the pipes. However, it has been difficult to provide for a secure retaining of the pre-mounted sealing rings during the transport and handling of the pipes with the sealing rings mounted therein. The problem or retaining the sealing rings during the jointing of the pipes is further emphasized in the case where the grooves have a bottom surface which is at least partly of a rounded shape. In this case, radially directed forces can create substantial twisting forces within the sealing rings which thereby may be placed in a position wherein they are not able to satisfy the intended sealing function.

As the type of pipe for which the sealing device according to the invention is especially intended are often used for outdoor water pipes, it has also been a problem to maintain the end portion of the pipe which is introduced into a sealing ring clean from dirt and foreign matter, especially as the mounting work must often take place outdoors under adverse conditions. This fact causes foreign matter to be introduced into the inner pipe and into the sealing ring, which causes leakage at the joint.

SUMMARY OF THE INVENTION

The object of the present invention is to provide a sealing device of the kind mentioned above which is designed in such a way that the above-mentioned drawbacks of prior art sealing devices are obviated.

According to the invention, there is provided a sealing device comprising a sealing ring consisting of an elastic material and adapted to be positioned in an annular groove in an outer pipe and having a sealing portion adapted sealingly to engage an inner pipe introduced into the outer pipe and the sealing ring. The sealing ring has, in addition to said sealing portion, an inwardly directed annular projection, and comprises a retainer ring which is adapted to cooperate with said projection in order to retain the sealing ring in a correct position in the groove, especially during the introduction of the end portion of the inner pipe into the sealing ring.

In order to prevent twisting of the sealing ring in the groove in the outer pipe when the inner pipe is introduced into and deforms the sealing portion of the sealing ring, it is preferred that the projection be positioned immediately in front of the retainer ring in the direction of the movement of the inner pipe when providing the joint while the sealing portion is positioned behind the retainer ring.

In a preferred embodiment of the invention, the projection has an entry surface converging in the direction of introduction of the inner pipe and a surface positioned in a radial plane facing the retainer ring, so that the projection is folded over the retainer ring and presses the ring radially outside when the projection is subjected to the action of the end portion of the inner pipe.

DETAILED DESCRIPTION

Figure 1:
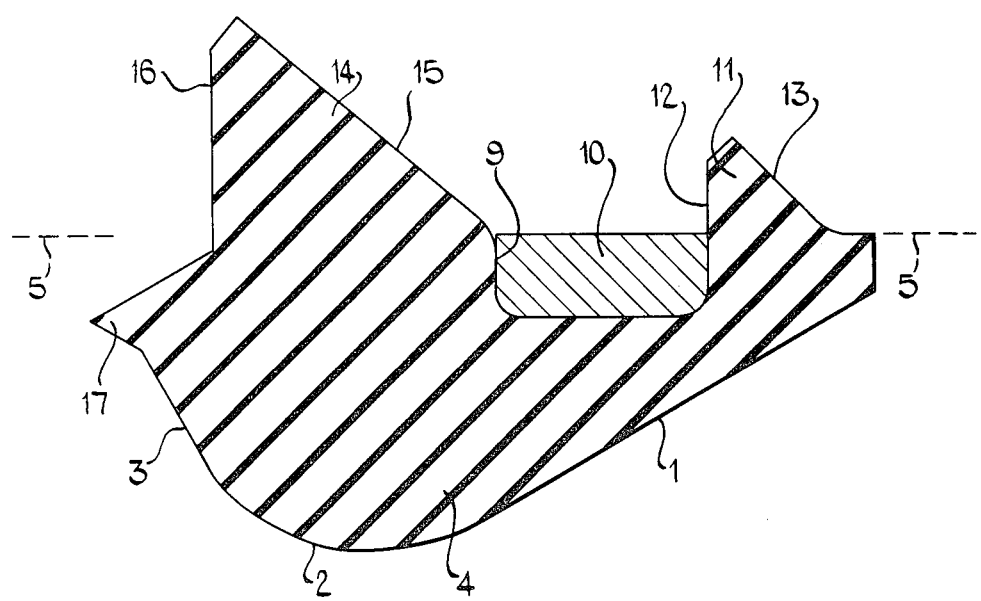
FIG. 1 is a section of a sealing device according to the invention.

The invention is especially intended to be used in connection with water pipes manufactured from plastic and formed with standardized internal grooves for receiving sealing rings. Pipes of this type can, for example, have a diameter of 150 mm and be subjected to an inner pressure of up to 10 Kp/cm$^2$. Pipes of this type are often placed outdoors, for which reason the jointing of the pipes often creates problems with regard to pollution of the joint areas and the sealing rings thereof. Additionally, the standardization of the pipes and the grooves therein result in the shape and dimensions of the grooves being predetermined and not subject to being changed.

The type of groove which is used for receiving sealing rings for pipes of the above type has a bottom surface the section of which is defined by a substantial arc shaped portion and a substantially straight portion which faces the opening of the pipe. Thus, the groove has a portion widening from the opening of the pipe, said portion being connected with a substantially cylindrical bottom portion in turn terminating in a relatively obtuse conical converging portion. This shape of the groove provides that a sealing ring adapted to be mounted therein must have an outer surface the section of which is defined by a straight portion 1, which is inclined in relation to the axis of the pipe, an arc shaped portion 2 and a further, inclined portion 3 connected therewith. These surface portions 1, 2 and 3 define between themselves and radially inside therefrom the body portion 4 of the sealing ring, said body portion being received in a groove in an outer pipe 6, the inner surface of the pipe being designated by means of line 5, and the axis being defined by means of line 8 in FIG. 1.

As appears from FIG. 1 there is provided a substantially U-shaped groove 9 in the main portion 4 of the sealing ring, and in this groove there is received a retainer ring 10, which is manufactured from a semi-rigid or rigid plastic material, metal, or the like, and can be provided with an axially extending slot, which is not shown in the drawings. As appears from the drawing, the retainer ring is positioned radially outside the inner surface 5 of the outer pipe 6, which provides that the retainer ring does not have any influence on the possibility of introducing an end portion of the inner pipe 7 in the sealing ring. The retainer ring 10 has the object of firmly retaining the sealing ring in the groove in the outer pipe 6 from the time of mounting of the sealing ring until the pipe shall be jointed at the place where it is to be used. Furthermore, the retainer ring 10 has the object of making sure that the sealing ring is retained in the intended position in the groove by cooperating with other portions of the sealing ring. A radially inwards directed projection 11 is provided on the main portion of the sealing ring for cooperating with the retainer ring 10 during the mounting. The projection is defined by a radially extending, annular surface 12, which defines the projection 11 in the direction of the retainer ring 10. In the opposite direction, the projection 11 is defined by a substantially conical entry surface, which is convergent in the direction of introduction of the inner pipe 7.

When designing sealing rings of the type according to the present invention, it is important that the deformation length be as long as possible for the portion of the sealing ring, which is deformed for engaging the inner pipe and sealing thereagainst. For this reason, the sealing ring according to the invention has a sealing portion 14 which, in the axial direction of the sealing ring, is provided within the area where the main portion 4 of the sealing ring has as great a radial dimension as possible. This means that the sealing portion 14 is positioned at the inner portion of the sealing ring where the main portion 4 is outwardly restricted by the inclined surface portion 3 and the arc shaped surface portion 2. In the embodiment shown in the drawing, the sealing portion 14 is a combination of a sealing lip and a compression portion which provides that the sealing portion 14 is, during the mounting of the joint, deformed in such a way that a substantial sealing pressure is created not only by the deformation but also in such a way that an inner overpressure in the jointed pipes 6, 7 additionally increases the sealing pressure. Thus, the sealing portion 14 has, like the projection 11, a substantially conical surface 15 converging in the direction of the introduction of the inner pipe 7, and a substantially radially directed surface 16.

The design of the sealing portion 14 as described above guarantees a very effective, and in all positions sufficient, sealing against the inner pipe 7. In order to provide for an additional security against leakage from the inner of the pipe to the environments through a slot between the bottom of the groove in the outer pipe 6 and the main portion 4 of the sealing ring, the main portion 4 is provided with an additional sealing projection 17 which, during the existence of an overpressure, works as a lip seal and seals against a surface portion of the groove corresponding to the inclined portion 3 of the main portion of the sealing ring.

However, the above mentioned position of the sealing portion 14 with regard to the desired, long radial compression is not quite without problems. When the inner pipe 7 is introduced through the sealing ring there will, of course, take place a deformation of the sealing ring 14, with a large radial component of force being exerted on the sealing ring. As this component force will be transferred substantially to the portion of the groove which is defined by surfaces corresponding to the inclined portion 3 of the main portion of the sealing ring, these radial forces will provide a great twisting moment on the sealing ring in the counter-clockwise direction as the sealing ring is shown in FIG. 1.

If this twisting moment is not counteracted, the right end of the sealing ring according to FIG. 1 is raised from the groove, so that the sealing ring does not take the intended position after the introduction of the inner pipe 7. This problem is obviated in accordance with the following.

Figure 2:
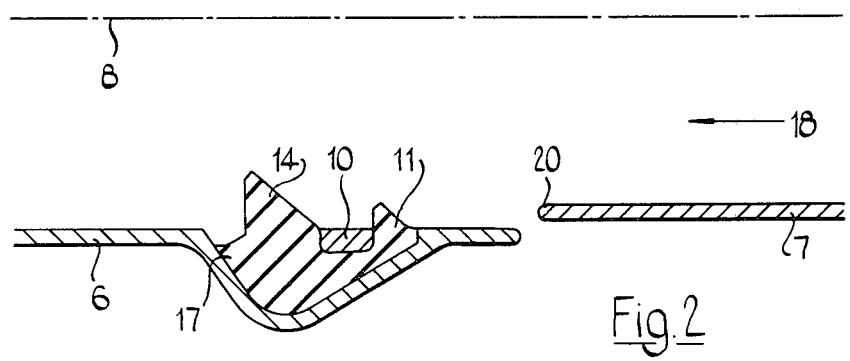
FIG. 2 is a section of the device positioned in an internal groove in an outer pipe before the mounting of a pipe joint.
Figure 3:
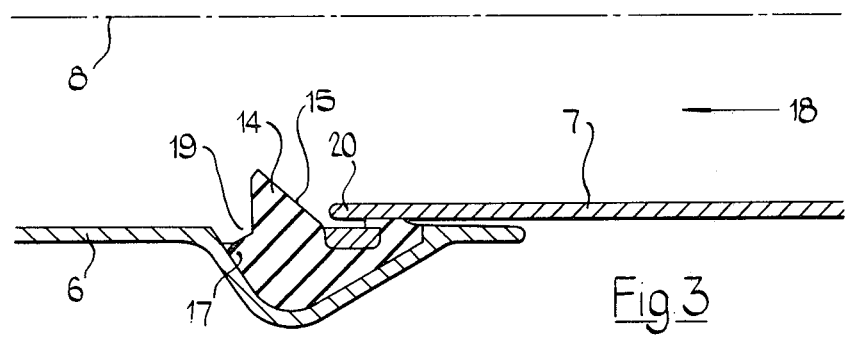
FIG. 3 is a section corresponding to FIG. 2 showing the mounting action.
Figure 4:
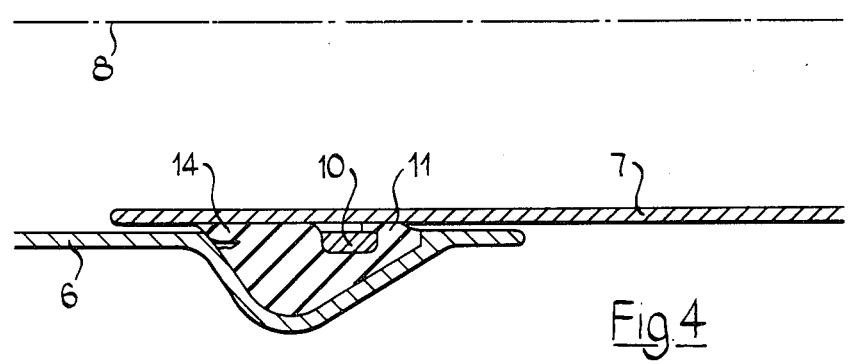
FIG. 4 is a section corresponding to FIGS. 2 and 3 after the mounting of the joint.

In FIGS. 2–4 there is schematically shown the jointing procedure of a pipe joint in accordance with the invention. FIG. 2 is a section through the sealing ring, the outer pipe 6, and the inner pipe 7, the axis of the outer pipe 6 being schematically shown by means of dot and dash line 8, and the direction of introduction of the inner pipe is schematically shown by means of arrow 18.

In FIG. 3, the inner pipe 7 has been introduced into the sealing ring and the outer pipe 6 so far that the projection 11 has been deformed, so that substantially the whole annular surface 12 thereof engages the inner surface of the retainer ring 10. This action takes place during the centering of the inner pipe 7 because of the conical shape of the entry surface 13 of the projection 11, whereby dirt or other foreign matter on the outer surface of the inner pipe 7 is wiped off by the projection 11, so that this foreign matter cannot enter into the sealing ring itself. As appears from the drawings, the radial dimension of the projection 11 as well as of the part of the main portion 4 of the sealing ring adjacent to the projection, is relatively small, in turn providing that the contact between the projection 11 and the inner pipe 7 is relatively rigid. This means that the part of the main portion 4 which is outwardly restricted by the inclined surface portion 1 is firmly pressed against the corresponding surface portion of the groove for receiving the sealing ring, whereby the whole sealing ring is securely maintained in correct position when the phase of the mounting procedure requiring the exertion of a substantial force takes place. The relative dimensioning of the projection 11 in the radial direction and the differences between the diameters of the pipes 6 and 7 is chosen in such a way that the radial force created by the deformation of the projection 11 in relation to the inclination angle of the inclined surface portion 1 does not provide the sealing ring with any clockwise directed twisting moment which has to be considered in this connection. Furthermore, the axial displacement of the projection 11 to engagement with the retainer ring 10 provides that the radial force is also transferred to the retainer ring whereby the ring is securely maintained in its correct position.

As the introduction of the inner pipe 7 is continued, the end 20 thereof will engage the conical surface 15 of the sealing portion 14, the sealing portion 14 being thereby deformed from the position according to FIGS. 2 and 3 to the position according to FIG. 4, wherein the sealing portion 14 is substantially deformed. This results in the sealing portion 14 being folded inwardly in the direction of the arrow 18 and the sealing portion 14 being compressed so that the space 19 between the radial surface 16 of the sealing portion 14 and the additional sealing lip 17 will be completely or partly filled. It appears from the drawings, that the deformation of the sealing portion 14 thereby taking place is substantial, in turn providing that the above-mentioned radial forces against the inclined surface portion of the groove corresponding to the inclined surface portion 3 of the main portion 4 can be substantial. However, this does not permit any twisting and thereby no displacement, as the main portion 4 is securely fixed in correct position because of the relatively rigid engagement between the projection 11 and the inner pipe 7.

The invention can be modified within the scope of the claims. Thus, it is possible that the annular, substantially radially directed surface 12 of the projection 11 might, instead, be more or less parallel with the entry surface 13 of the projection 11, so that the projection can extend across the retainer ring 10 before the introduction of the end portion 17 of the inner pipe 7. A corresponding modification of the design of the sealing portion 14 is, of course, also possible, the sealing portion 14 being more or less a lip seal.

Of course, it is possible to adapt the invention to other types of sealing rings having an outer surface which is not predetermined by the design of a standardized groove in the pipe, where the sealing ring is to be placed.

While this invention has been described as having a preferred design, it will be understood that it is capable of further modification. This application is, therefore, intended to cover any variations, uses, or adaptations of the invention following the general principles thereof and including such departures from the present disclosure as come within known or customary practice in the art to which this invention pertains and fall within the limits of the appended claims.

What is claimed is:

1. A pipe joint comprising, in combination, an outer pipe having an annular groove therein and an inner pipe inserted within said outer pipe, a sealing ring having a body portion of resilient material, said sealing ring positioned in the annular groove in said outer pipe and having a sealing portion adapted to sealingly engage said inner pipe introduced therein, said sealing ring having a first radially inwardly extending projection having an annular conical entry surface to center the inner pipe as it is being inserted into the outer pipe and to remove any foreign matter which may be present from the outer surface of the inner pipe, said sealing ring having a second radially inwardly extending projection forming said sealing portion and having an annular conical surface to provide an elongated deformation length which serves as a sealing area with respect to the inner pipe when the inner and outer pipes are assembled, an annular groove provided in the body portion between the first and second projections, an annular retainer ring positioned in the annular groove of the body portion for retaining the sealing ring in the annular groove in the outer pipe, said first projection being deformed by the inner pipe inserted into the outer pipe to engage the inner surface of the retainer ring and being compressed between said retainer ring and inner pipe to provide force on said retainer ring so that the body portion of said sealing device is securely maintained in the annular groove of the outer pipe, and said second projection being folded radially outwardly as the inner pipe is inserted to form a seal between the inner and outer pipe.

2. A device as set forth in claim 1 wherein the first projection is provided with an annular surface which surface engages the retainer ring as the inner pipe is being inserted into the outer pipe to provide radial force to the retainer ring whereby the retainer ring is maintained in the annular groove of the sealing device to hold said sealing device in the annular groove of the outer pipe.

3. A device as set forth in claim 1 wherein a third projection is provided to engage said second projection to provide an additional seal in the annular groove of the outer pipe.